(12) United States Patent
Mason et al.

(10) Patent No.: US 11,707,705 B2
(45) Date of Patent: Jul. 25, 2023

(54) MULTI-FUNCTION HYDRAULIC SEPARATOR

(71) Applicant: NIBCO Inc., Elkhart, IN (US)

(72) Inventors: Christopher W. Mason, Granger, IN (US); Andrew J. Terry, Sturbridge, MA (US)

(73) Assignee: NIBCO Inc., Elkhart, IN (US)

( * ) Notice: Subject to any disclaimer, the term of this patent is extended or adjusted under 35 U.S.C. 154(b) by 84 days.

(21) Appl. No.: 17/308,087

(22) Filed: May 5, 2021

(65) Prior Publication Data

US 2022/0355230 A1    Nov. 10, 2022

(51) Int. Cl.

| | | |
|---|---|---|
| *B01D 36/00* | (2006.01) |
| *B01D 17/04* | (2006.01) |
| *B03C 1/28* | (2006.01) |
| *B03C 1/30* | (2006.01) |
| *B01D 35/06* | (2006.01) |
| *F24D 19/00* | (2006.01) |
| *F24D 3/10* | (2006.01) |
| *B03C 1/033* | (2006.01) |
| *F24D 19/08* | (2006.01) |

(52) U.S. Cl.
CPC ......... *B01D 36/003* (2013.01); *B01D 17/045* (2013.01); *B01D 35/06* (2013.01); *B01D 36/001* (2013.01); *B03C 1/0332* (2013.01); *B03C 1/284* (2013.01); *B03C 1/286* (2013.01); *B03C 1/30* (2013.01); *F24D 3/1091* (2013.01); *F24D 19/0092* (2013.01); *F24D 19/083* (2013.01); *B03C 2201/18* (2013.01)

(58) Field of Classification Search
CPC .. B01D 36/003; B01D 36/001; B01D 17/045; B01D 35/06; B01D 29/114; B01D 29/117; B01D 29/58; B03C 1/0332; B03C 1/284; B03C 1/286; B03C 1/30; B03C 2201/18; B03C 2201/28; B03C 1/288; F24D 3/1091; F24D 19/0092; F24D 19/083
See application file for complete search history.

(56) References Cited

U.S. PATENT DOCUMENTS 5,685,974 A    11/1997  Fleming
6,730,217 B2   5/2004   Schaaf et al.
(Continued)

FOREIGN PATENT DOCUMENTS

DE        20304324 U1  *  7/2003  ............... F24D 3/10
DE     102011109164 A1  *  2/2013  ............... C02F 1/20
(Continued)

OTHER PUBLICATIONS

Pall Rings 2016 https://web.archive.org/web/20160804202357/https://www.pallrings.co.uk/products/pall-rings-stainless-steel/ (Year: 2016).*
(Continued)

*Primary Examiner* — Liam Royce
(74) *Attorney, Agent, or Firm* — Price Heneveld LLP

(57) ABSTRACT

A hydronic system separator has an air separator with a vent release mechanism to remove air from the fluid within a hydronic system. The separator includes a magnetic assembly for collecting ferrous particles from the fluid. One or more screens are used to remove other particles from the fluid. The separator housing includes a removable debris collection receptacle that has a drain assembly.

20 Claims, 11 Drawing Sheets

(56) References Cited

U.S. PATENT DOCUMENTS

| | | |
|---|---|---|
| 7,117,888 B2 | 10/2006 | Niekolaas |
| 8,251,021 B1 | 8/2012 | Corbett, Jr. |
| 9,925,543 B2 | 3/2018 | Caleffi |
| 10,005,089 B2 | 6/2018 | Adey et al. |
| 10,016,702 B2 | 7/2018 | Cnossen et al. |
| 2003/0150324 A1* | 8/2003 | West ............... B01D 17/0211 95/268 |
| 2006/0102558 A1* | 5/2006 | Niekolaas ............. F24D 3/1091 210/512.1 |
| 2014/0367340 A1* | 12/2014 | Caleffi ................ F24D 19/0092 210/695 |
| 2016/0215992 A1 | 7/2016 | Schreiner et al. |
| 2020/0139275 A1* | 5/2020 | Cowley ............... B03C 1/0332 |
| 2020/0222832 A1* | 7/2020 | Holbach ............... B03C 1/288 |
| 2022/0243929 A1* | 8/2022 | Molina ............... F24D 3/1091 |

FOREIGN PATENT DOCUMENTS

| | | | |
|---|---|---|---|
| EP | 3608007 A1 * | 2/2020 | ............ B01D 19/00 |
| GB | 2534162 A * | 7/2016 | ............ C02F 1/482 |
| WO | 2017164745 | 3/2017 | |
| WO | 2018207083 | 5/2018 | |

OTHER PUBLICATIONS

Webstone Magnetic Boiler Filter—The Powerful Way to Stay Efficient YouTube video dated Mar. 1, 2019 https://www.youtube.com/watch?v=pmZaip09_kA (Year: 2019).*

Caleffi, "SEP4 combination hydraulic, air, dirt and magnetic separator," Caleffi North America, Inc., Milwaukee, WI (2020).

Legend, "Hydraulic separator from Legend," https://www.pmengineer.com/articles/93559-hydraulic-separator-from-legend (Feb. 19, 2018).

F.W. Webb, stills of "PurePro Hydro Separator" from https://www.youtube.com/watch?v=MbmlwDDDfo8, fwwebb.com/heating, fwwebb.com/purepro (Oct. 15, 2020).

* cited by examiner

MULTI-FUNCTION HYDRAULIC SEPARATOR

BACKGROUND OF THE INVENTION

A hydronic piping system can utilize two or more circulating pumps with a variety of fluids, including, but not limited to, water. There are different ways of achieving a multiple circulating pump hydronic piping system, including closely spaced tee fittings, a parallel piping system with a primary circulator, using a hydraulic separator, etc. A hydraulic separator can enable two or more circulating pumps to operate without interfering with each other. The hydraulic separator prevents the flow in one circuit from interfering with the flow in another circuit. The low vertical velocity inside the chamber of the hydraulic separator produces minimal to no pressure drop from top to bottom and side to side within the internal chamber. During circulation, the fluid within a hydronic piping system can include solid particles which can be loosened from the interior of the appliances, piping/tubing, pumps, or otherwise. Solid particles can also be present as contaminants in the fluid originally supplied to the system and/or contaminated by different components of the system. The solid particles can cause malfunction of and/or buildup in the appliances. In addition, the solid particles can reduce the effectiveness of the hydronic system by restricting the flow of the fluid and clogging certain components of the appliances. Thus, there is a need to allow multiple circulating pumps while cleaning the fluid within a hydronic system to remove solid particles.

Various devices are known for removing particles that are suspended in the fluid. Typically these devices can include a magnet for attracting ferrous particles and may include a mechanical separator, such as screens, for removing non-magnetic particles. While particles can be removed from the fluid by use of screens and/or magnets within a separation chamber, the efficient collection and removal of the collected particles can be difficult. For example, in order to gain access to the internal chamber of a hydraulic separator, may require the separator to be disconnected from the piping system, which can require removing multiple fittings that connect the hydraulic separator to the piping/tubing of the system. Moreover, the space within which to place the hydraulic separator in a hydronic piping system is typically constrained. The removal and/or cleaning of a magnet typically requires some clearance as the magnet is typically inserted in a direction that is perpendicular to the longitudinal centerline of the hydraulic separator.

Thus, it would be advantageous to have a hydraulic separator which makes it easier to service the magnet, to remove the collected debris, and to access the internal chamber of the hydraulic separator.

SUMMARY OF THE INVENTION

One aspect of the present invention is a hydronic system separator. The hydronic system separator includes a housing that has an upper section and a lower section. The lower section is releasably coupled to the upper section. The housing has an internal chamber with an upper portion, a lower portion, and a medial portion therebetween. The hydronic system separator includes an air separator coupled to the upper section of the housing. The housing has spaced apart first openings to permit fluid to pass through the housing in a first direction and spaced apart second openings to permit fluid to pass through the housing in a second direction. The hydronic system separator has at least one internal filter that is positioned within the upper section of the internal chamber in between the spaced apart first openings. A magnetic bar is removably coupled to the lower section of the housing to position the magnetic bar in an angled position within the lower portion of the internal chamber. A drain valve is coupled to the lower section of the housing.

In yet another aspect of the present invention is a separator assembly that includes a housing having an upper section and a lower section that is releasably coupled to the upper section. The housing has an internal chamber with an upper portion, a lower portion, and a medial portion therebetween. The separator assembly includes an air separator that is coupled to the upper section of the housing. The housing has spaced apart first openings to permit fluid to pass through the housing in a first direction, and spaced apart second openings to permit fluid to pass through the housing in a second direction. At least one first internal filter is positioned within the upper portion of the internal chamber between the spaced apart first openings. A magnetic bar is removably coupled to the lower section of the housing at an approximately 45° angle with respect to the longitudinal centerline of the housing. A drain valve is coupled to the lower section of the housing.

Yet another aspect of the present invention is a hydronic system separator assembly. The hydronic system separator assembly includes a housing having an upper section and a lower section that is releasably coupled to the upper section. The housing has an internal chamber with an upper portion, a lower portion, and a medial portion therebetween. An air separator is coupled to the upper section of the housing. The housing has spaced apart first openings to permit fluid to pass through the housing in a first direction, and spaced apart second openings to permit fluid to pass through the housing in a second direction. Tubing is coupled to the spaced apart first openings and spaced apart second openings. The hydronic system separator includes at least one internal filter positioned within the upper portion of the internal chamber in between the spaced apart first openings. A magnetic bar is coupled to the lower section at an angled position within said lower portion of the internal chamber. A drain valve is coupled to the lower section of the housing of the hydronic system separator assembly.

These and other features, advantages, and objects of the present invention will be further understood and appreciated by those skilled in the art by reference to the following specification, claims, and appended drawings.

DETAILED DESCRIPTION

Figure 1:
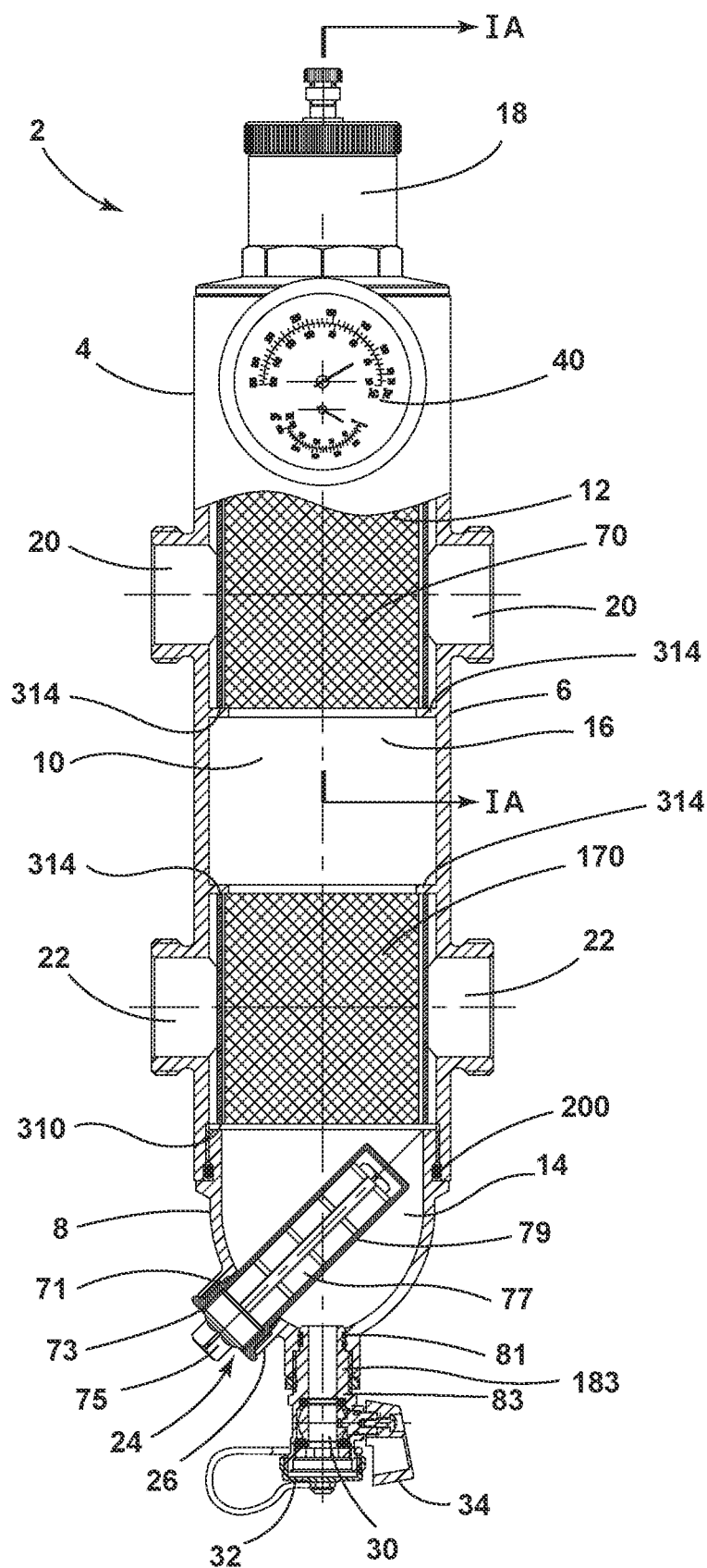
FIG. 1 is a partial front cross-sectional view of an embodiment of a hydronic system separator.

For purposes of description herein, the terms "upper," "lower," "right," "left," "rear," "front," "vertical," "horizontal," and derivatives thereof shall relate to the invention as oriented in FIGS. 1-13. However, it is to be understood that the invention may assume various alternative orientations and step sequences, except where expressly specified to the contrary. Indeed, other exemplary orientations are shown in the Figures. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Detailed embodiments of the present invention are disclosed herein, however, it is to be understood that the disclosed embodiments are merely exemplary of the invention, which may be embodied in various forms. Therefore, specific functional or structural details disclosed herein are not to be interpreted as limiting, but merely as a basis for the claims and as a representative basis for teaching one skilled in the art to variously employ the present invention in virtually any appropriately detailed embodiment.

A hydronic system separator 2 is disclosed in FIGS. 1-13. The hydronic system separator 2 includes a housing 4 that is made of a high-strength material. Exemplary materials include high-strength polymers and metallic materials, such as brass. In the illustrated embodiments, the housing 4 is a heavy-duty cast brass body. The housing 4 includes an upper section 6 and a lower section 8. The lower section 8 is removably coupled to the upper section 6. The lower section 8 can be coupled to the upper section 6 via threaded surfaces that engage the upper section 6 and the lower section 8. Alternatively, the lower section 8 can be coupled to the upper section 6 by other means, including the engagement of surfaces on the upper section 6 and the lower section 8. In addition, O-rings 200 can be used to seal the connection between the upper section 6 and the lower section 8. In the illustrated embodiment, the upper section 6 and lower section 8 are made from the same material. However, the upper section 6 and lower section 8 can each be made from different materials.

The housing 4 includes an internal chamber 10. The internal chamber 10 has a lower portion 14, an upper portion 12, and a medial portion 16. The lower portion 14 is surrounded by the lower section 8 of the housing 4. An air separator 18 is located at the upper section 6 of housing 4 in communication with the upper portion 12 of the internal chamber 10. A pair of first spaced apart openings 20 are located above a pair second spaced apart openings 22 in the medial portion 16 of the internal chamber 10.

The air separator 18 has a replaceable vent float mechanism 53. The air separator 18 can remove and release air bubbles that are located within the fluid that enters into the first spaced apart openings 20. A filter 70 separates air from the fluid. The air collects in the top of the air separator 18, while the fluid that passes through the filter 70 has the air bubbles removed. The mounting air volume forces the fluid level in the top of the air separator 18 to drop, lowering the replaceable vent float 53. The alignment pin 55, connected to diaphragm 57, guides the replaceable vent float 53 as it descends, preventing jams and ensuring smooth operation. As the replaceable vent float 53 drops, the vent head 21 opens, releasing the collected air from the air separator 18 on the hydronic system separator 2.

The replaceable vent float 53 is connected to a link 41. The link 41 is coupled to a coupling rod 37 that is coupled to a bracket 43 that is secured with retainer ring 39. A stem 25 is coupled to coupling rod 37. The stem 25 is surrounded by spring 27 to provide the upward force. The stem 25 is secured in place by locating screw 23 and seals against the body with O-ring 35. Exhaust nut 19 allows the air to vent automatically or can be manually closed off by threading down to engage gasket 3 contained in the exhaust nut 19. O-rings 33, 51 can help seal the air separator 18 to the upper section 6. All the aforementioned air separator components are contained or connected to the cap 31 which is secured to the upper section 6 of housing 4 with cap nut 29.

The hydronic system separator 2 also includes a magnetic bar assembly 24. The magnetic bar assembly 24 is received in magnetic bar assembly opening 26 in the lower section 8 of the housing 4. The magnetic bar assembly 24 includes a protective sleeve 73 that surrounds a magnetic block 77. A core rod 75 extends into magnetic block 77. One or more washers 79 can be used as part of the magnetic bar assembly 24. The magnetic bar assembly 24 is coupled to the lower section 8 of housing 4 by a threaded connection and/or other type of connection. Thus, the magnetic bar assembly 24 can be easily removed allowing the trapped particles to separate from the protection sleeve 73 and to drop into the lower section 8 for removal by flushing the drain valve 30 or removal when lower section 8 is removed from upper section 6 of the magnetic block 77 that is located within the protective sleeve 73. The magnetic block 77 can have a 12,000 Gauss rating or higher. One or more O-rings 71 can be used to create a seal between the magnetic bar assembly 24 and the magnetic bar assembly opening 26 within the lower section 8 of the housing 4.

The protective sleeve 73 has an opening 215 that receives the magnetic block 77. The protective sleeve 73 has outside surface 203 which may be shaped with a hexagonal pattern to assist in the installation of the protective sleeve 73 into magnetic bar assembly opening 26 in the lower section 8 of the housing 4. The protective sleeve 73 includes an innermost surface 201 and an outer wall 209 that has external shoulders 205 and 207 one or more of which can engage corresponding surfaces on the magnetic bar assembly opening 26 in the lower section 8 of the housing 4. The protective sleeve 73 can be positioned such that the entire protective sleeve 73 remains below the top surface plane 350 of the lower section 8, as illustrated in FIG. 4.

As illustrated in FIGS. 1-4, 7, and 8, the magnetic bar assembly 24 can be positioned at an angle A with respect to the longitudinal centerline C1 of the housing 4. In the illustrated embodiments, angle A is in the range of 30° -60°

Figure 5:
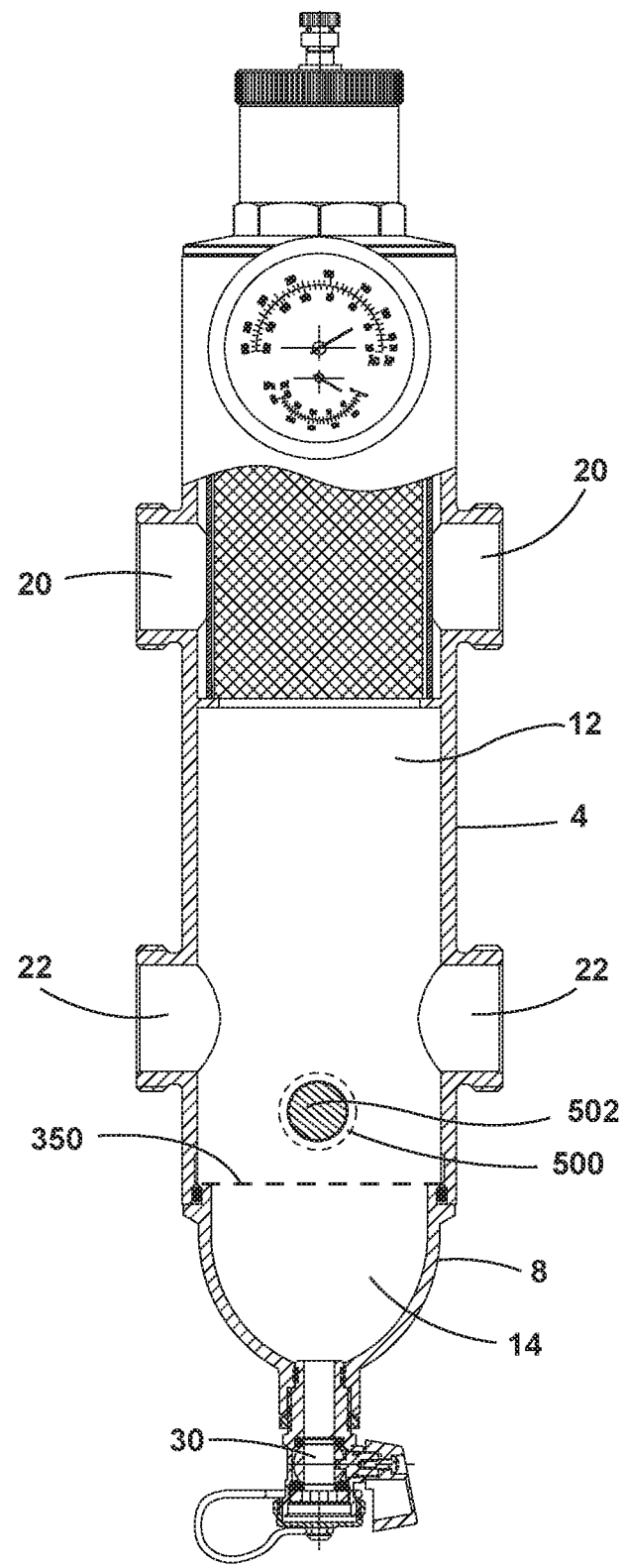
FIG. 5 is a partial front cross-sectional view of another embodiment of a hydronic system separator.
Figure 6:
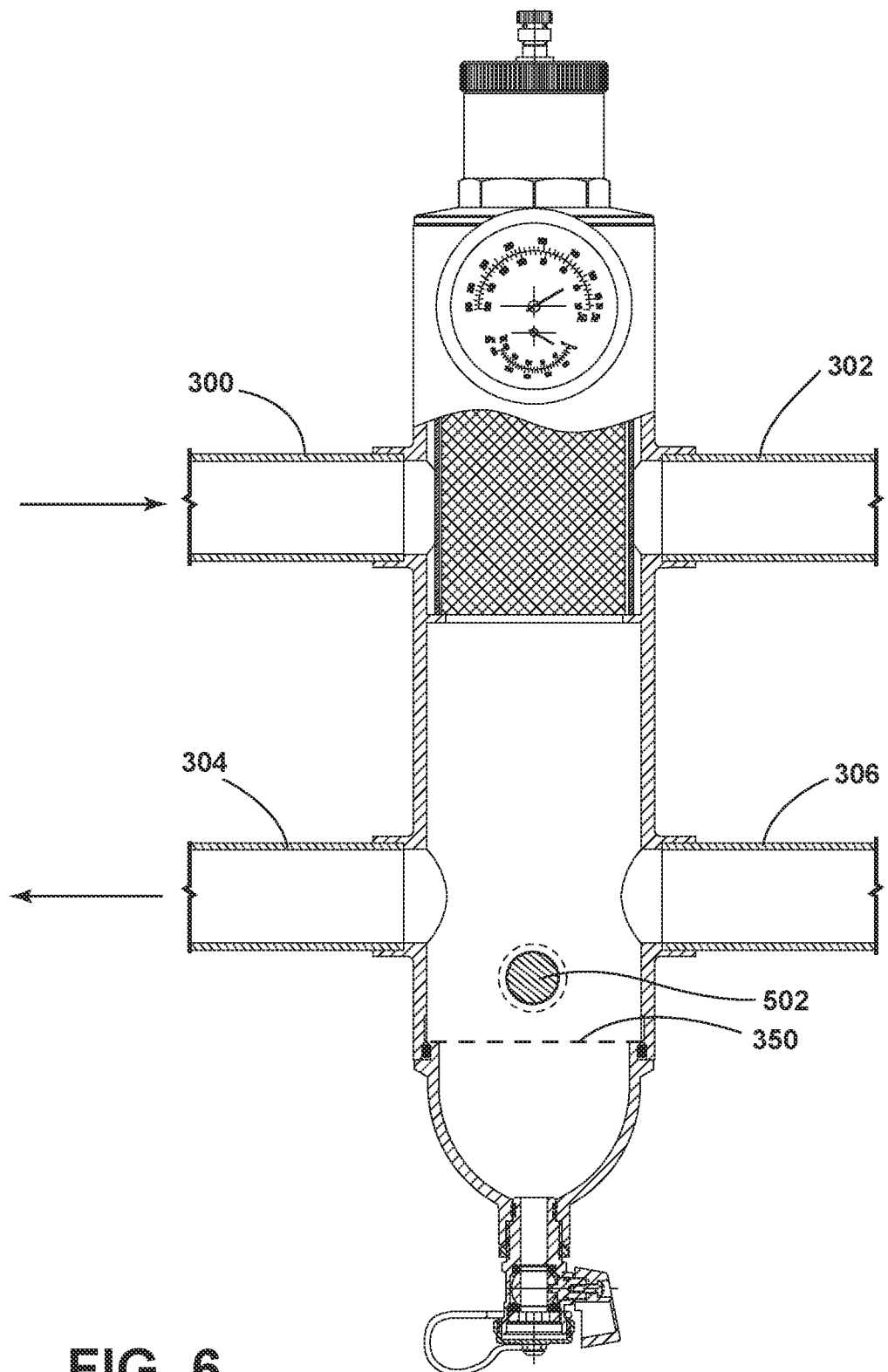
FIG. 6 is a partial front cross-sectional view the hydronic system separator of FIG. 5 connected to tubing.

, and preferably about 45°. This permits easier access to the magnetic bar assembly 24 for servicing. In addition, the debris filtered by one or more of the filters 70, 170 passes by the magnetic bar assembly 24. The angled magnetic bar assembly 24 can be positioned lower within the hydronic system separator 2 relative to one that is positioned in a non-angled manner. The magnetic bar assembly 24 can also be longer if positioned in an angled manner when compared to embodiments where the magnetic bar assembly 24 is straight. See FIGS. 5 and 6 showing magnetic bar 502 within protective sleeve 500 oriented in a generally perpendicular manner to the longitudinal centerline C1 of housing 4. In this orientation, the magnetic bar 502 is positioned above the top surface plane 350 of the upper end of lower section 8, as shown in FIG. 6.

Figure 4:
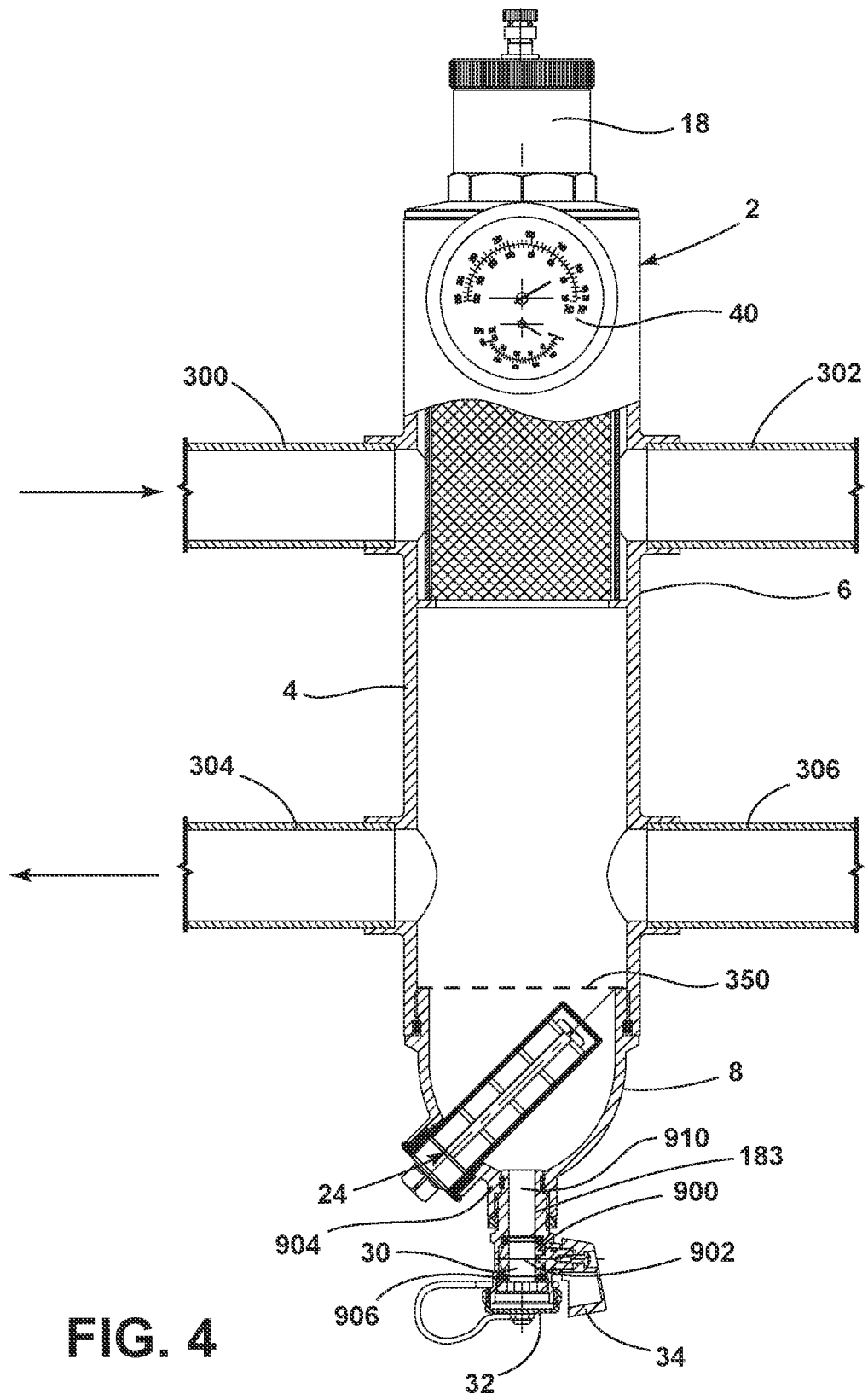
FIG. 4 is a partial front cross-sectional view of the hydronic system separator of FIG. 3 connected to tubing.

The hydronic system separator 2 also includes a drain valve 30, as shown in FIG. 4. The drain valve 30 can include a drain valve cap 32. The drain valve 30 can be actuated by handle 34 to open and close the ball 900 that is located within the fluid passageway 910 at the bottom end 904 of the lower section 8 of the housing 4. One or more seals 906 can be positioned around the ball 900 to seat the ball 900 within the fluid passageway 126. The handle 34 can be turned to open the drain valve 30 to permit the draining of the hydronic system separator 2 through the drain valve 30. The drain valve 30 can be threaded so that it can be connected to a hose for draining and/or purging. The drain valve 30 can be coupled to the lower section 8 by a spring clip/lock ring 183. The spring clip/lock ring 183 prevents the drain valve from being accidentally uncoupled from the lower section 8 while also enabling the drain valve 30 to be rotated 360° so that the handle 34 can be selectively positioned for easier access.

Figure 1A:
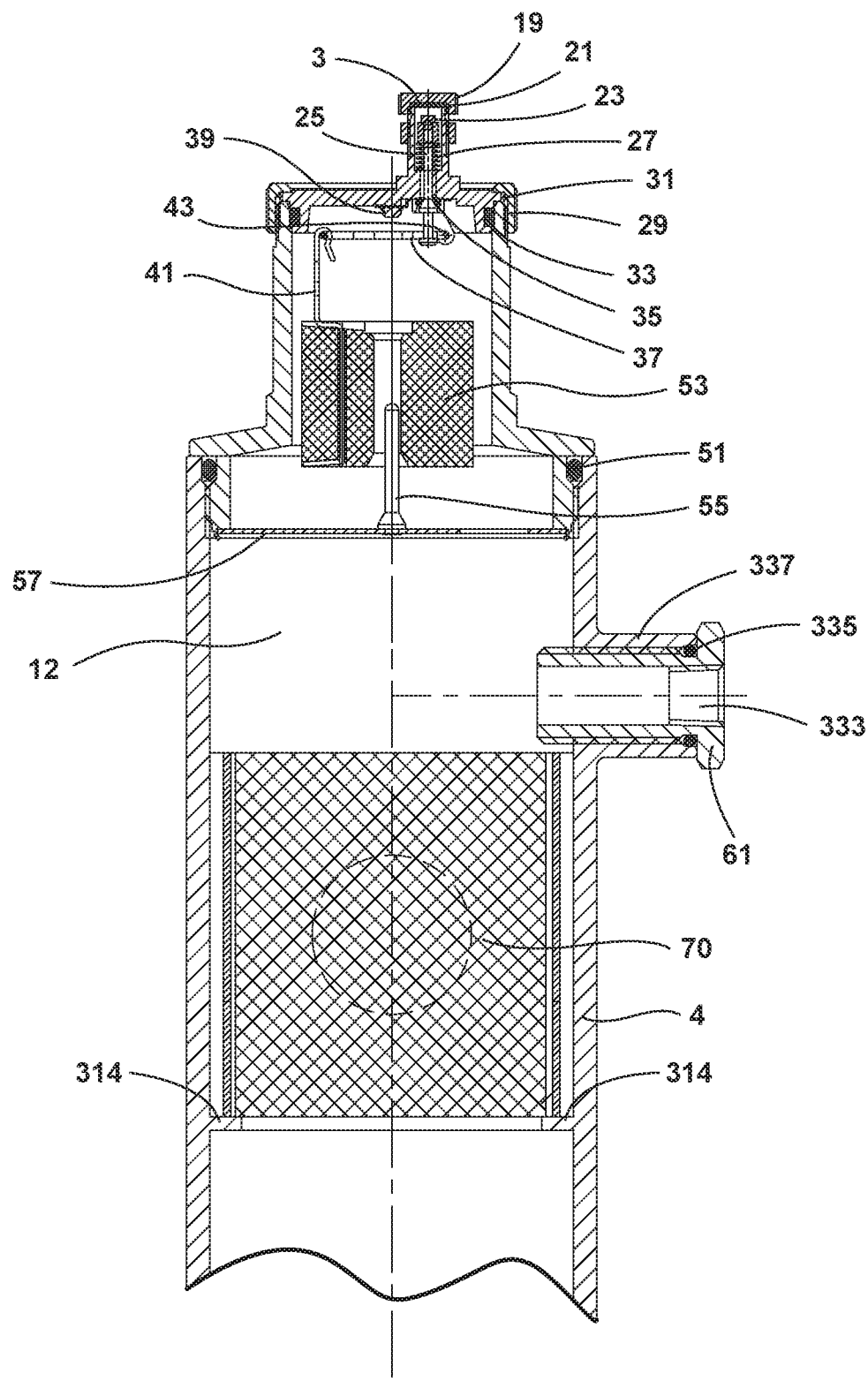
FIG. 1A is a partial front cross-sectional view of the upper portion of the hydronic system separator of FIG. 1.

The hydronic system separator 2 can also include a gauge 40. The gauge 40 in the illustrated embodiments is both a temperature and pressure gauge. The temperature and pressure gauge 40 can display the temperature and pressure of the fluid within the hydronic system separator 2. The gauge 40 can couple directly to the housing 4 or can include a fitting 61 that couples to fitting opening 337 in housing 4. The fitting 61 includes a fluid passageway 333, as shown in FIG. 1A. The fitting 61 can be sealed to the fitting opening 337 by one or more seals 335. Seals 335 could be a rubber O-ring.

Figure 11:
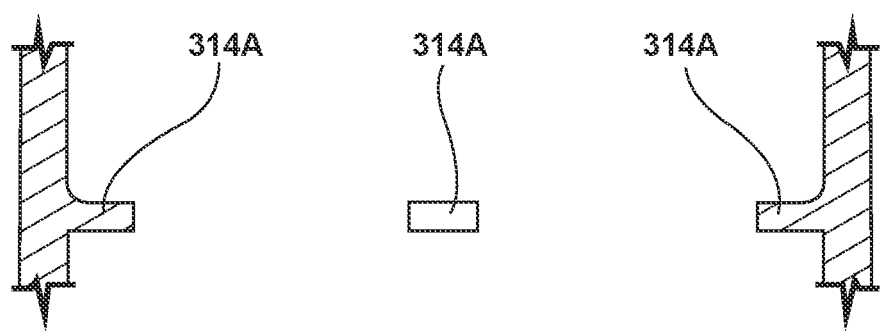
FIG. 11 is a partial front cross-sectional view of a segmented surface within the internal chamber of a hydronic system separator.
Figure 12:
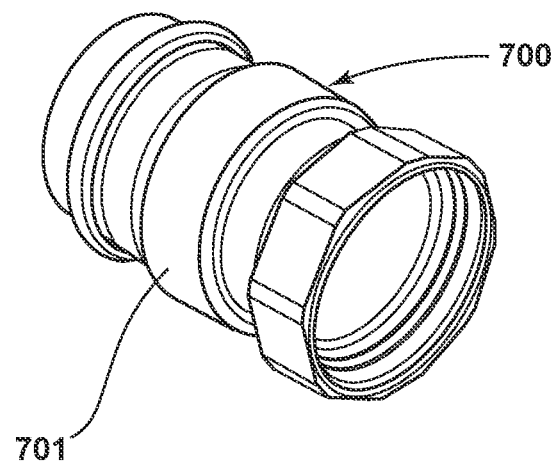
FIG. 12 is an isometric view of a union fitting that can be used on one or more of the spaced apart openings of the hydronic system separator shown in FIGS. 1, 3, and/or 5.
Figure 13:
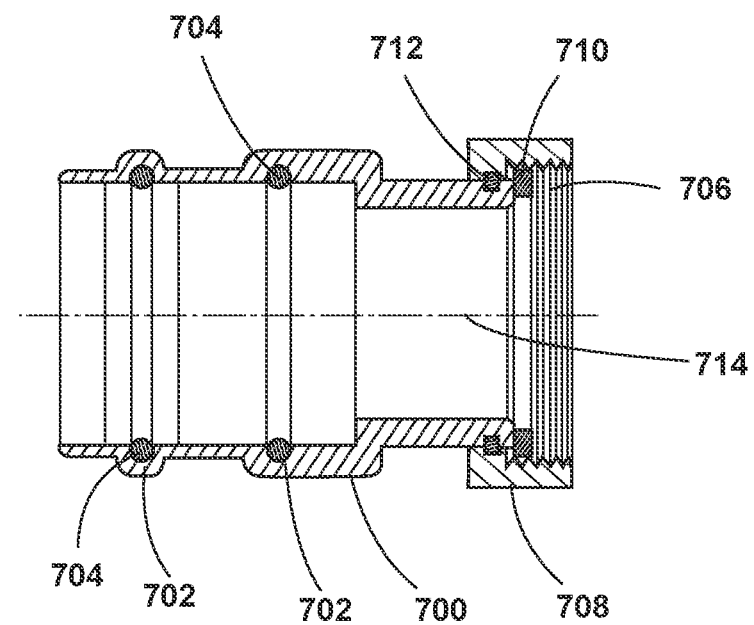
FIG. 13 is a cross-sectional view of the union fitting shown in FIG. 12.

The filters 70, 170 that are located within the internal chamber 10 can be selectively positioned within the hydronic system separator 2 by abutting internal surfaces in the internal chamber 10. For example, in the embodiments illustrated in FIGS. 3-6, a single filter 70 is positioned in between the first spaced apart openings 20. The filter 70 can abut a surface 314 on the internal chamber 10. The surface 314 can be continuous or a segmented surface 314A, as shown in FIG. 11. The use of a segmented surface 314A can minimize internal flow resistance when compared to a continuous surface 314 by opening up more of the internal chamber 10. In addition, filter 70 can also abut and/or be positively limited by the lower surface of the fitting 61, as shown in FIG. 1A. Alternative embodiments (FIGS. 1-2) have another filter 170 that is located in the internal chamber 10 between the second spaced apart openings 22. Filter 170 is also positioned between surfaces 314 (or segmented 314A) on the internal chamber 10. A ledge 310 can also be positioned at the upper surface of the lower section 8 within the internal chamber 10. The ledge 310 can be formed by the upper surface of lower section 8, can be formed on the lower portion of upper section 6 adjacent to the lower section 8, or can be an insert positioned therebetween. The ledge 310 can be continuous or segmented. Filters 70, 170 can be made of a polymeric, metal, or other filter material. In the illustrated examples, the filters 70, 170 are stainless steel coalescing medium filters.

Figure 2:
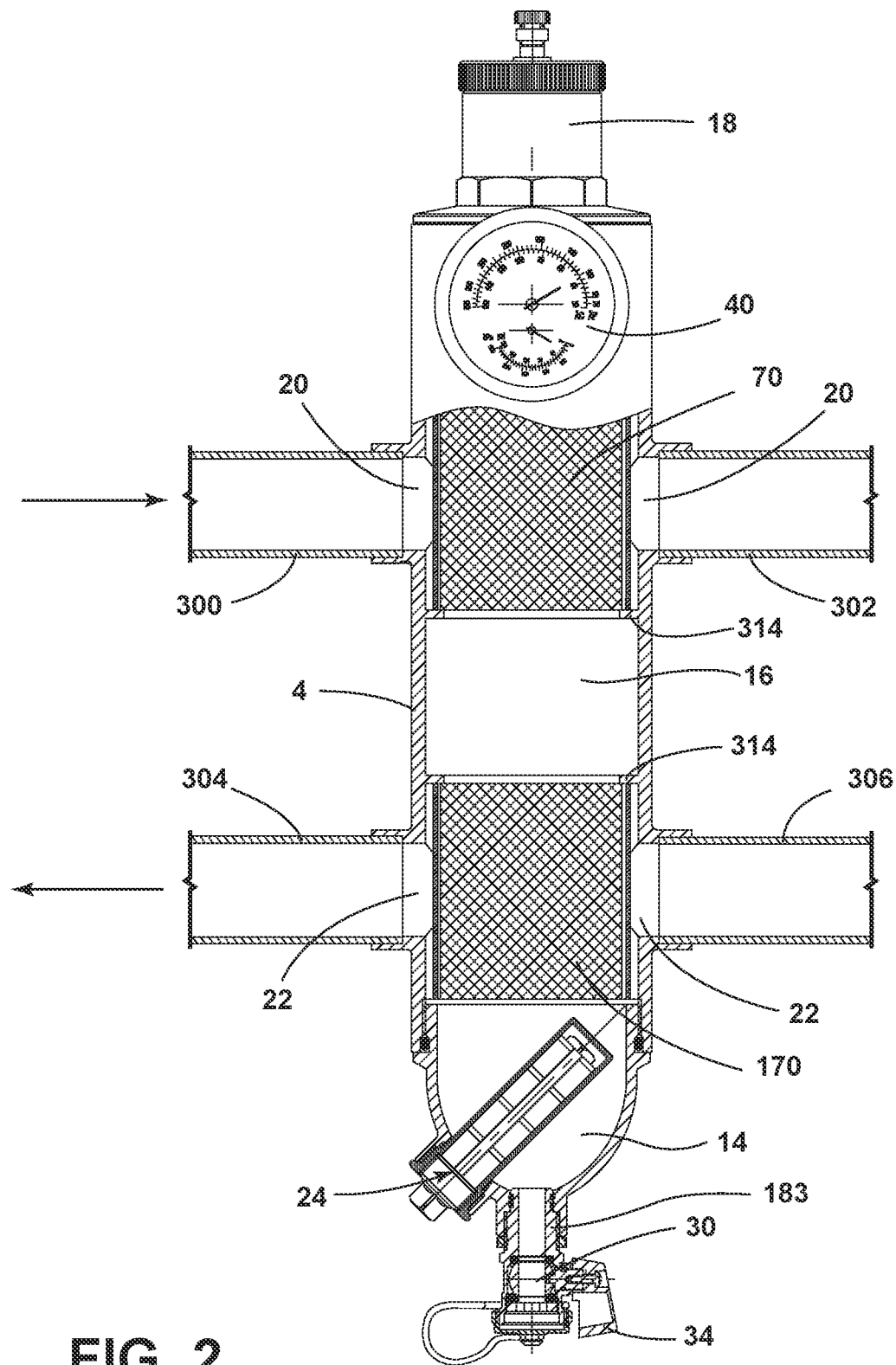
FIG. 2 is a partial front cross-sectional view of the hydronic system separator of FIG. 1 connected to tubing.
Figure 3:
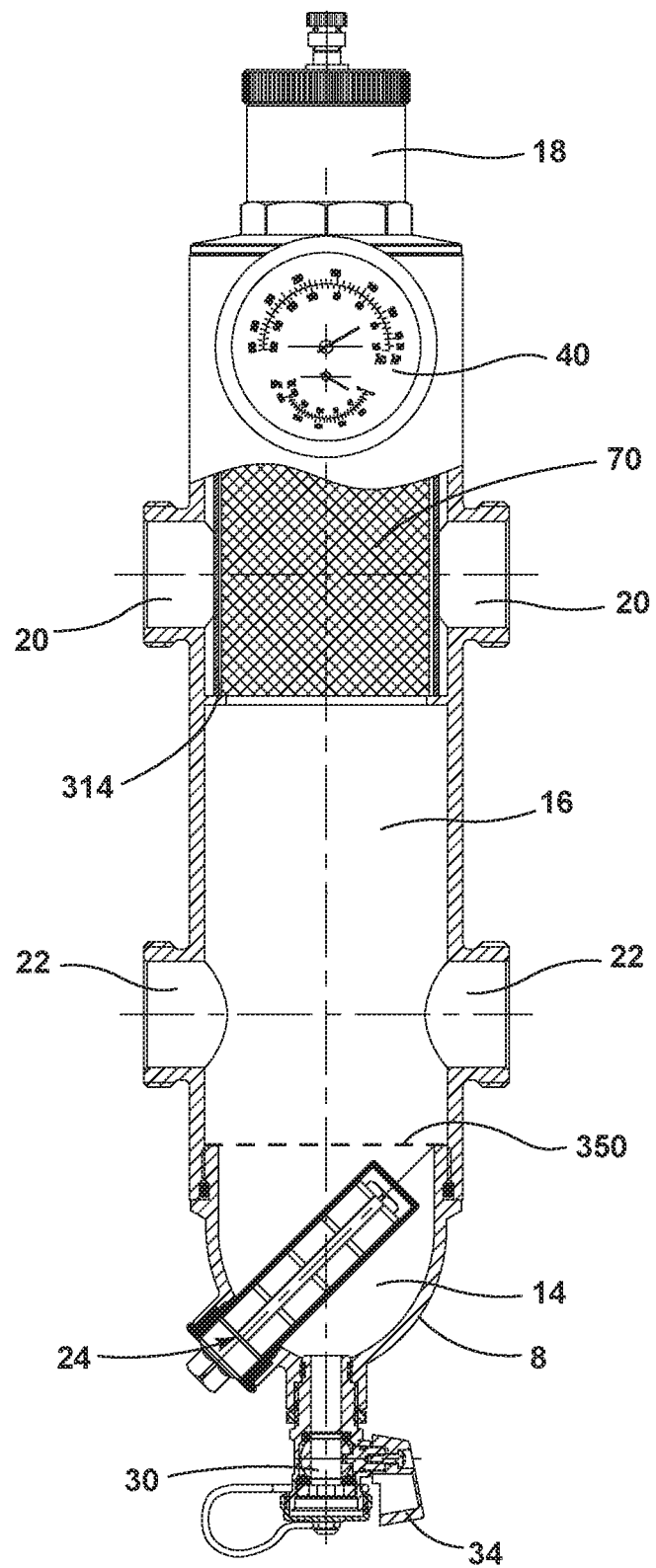
FIG. 3 is a partial front cross-sectional view of another embodiment of a hydronic system separator.

Piping or tubing 300, 302 can be connected to the first spaced apart openings 20. In addition, piping or tubing 304, 306 can be connected to the second spaced apart openings 22. As illustrated in FIGS. 2, 4, and 6, the supply from the boiler out to the system is shown by the arrow by the first spaced apart openings 20. Similarly, the return to the boiler from the heating system is illustrated by the arrow by the second spaced apart openings 22. The piping or tubing 300, 302, 304, and 306 can be any type of conventional tubing, including PEX, copper pipe, or other types of tubing/piping.

Figure 7:
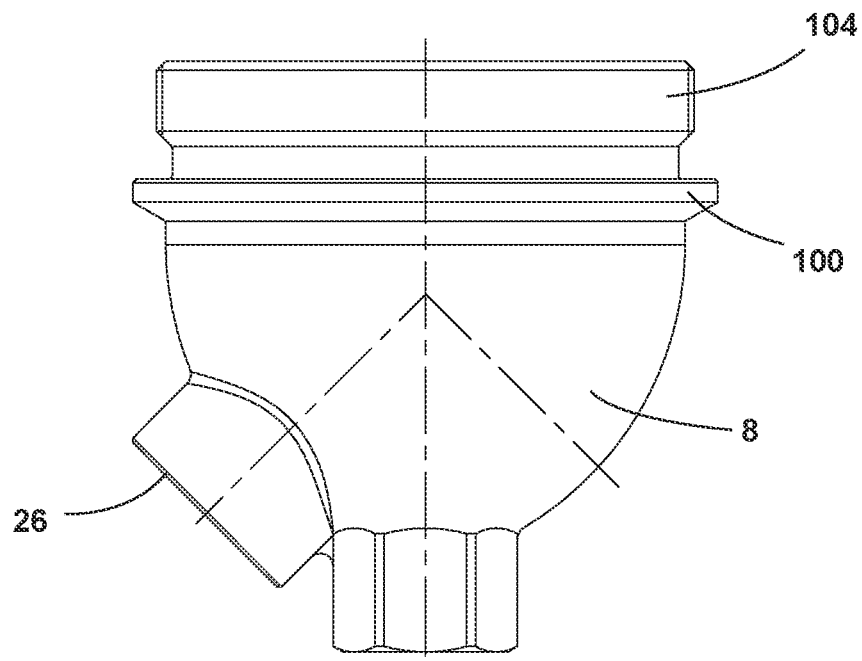
FIG. 7 is a front view of the lower section of the housing of the hydronic system separator shown in FIG. 1.
Figure 8:
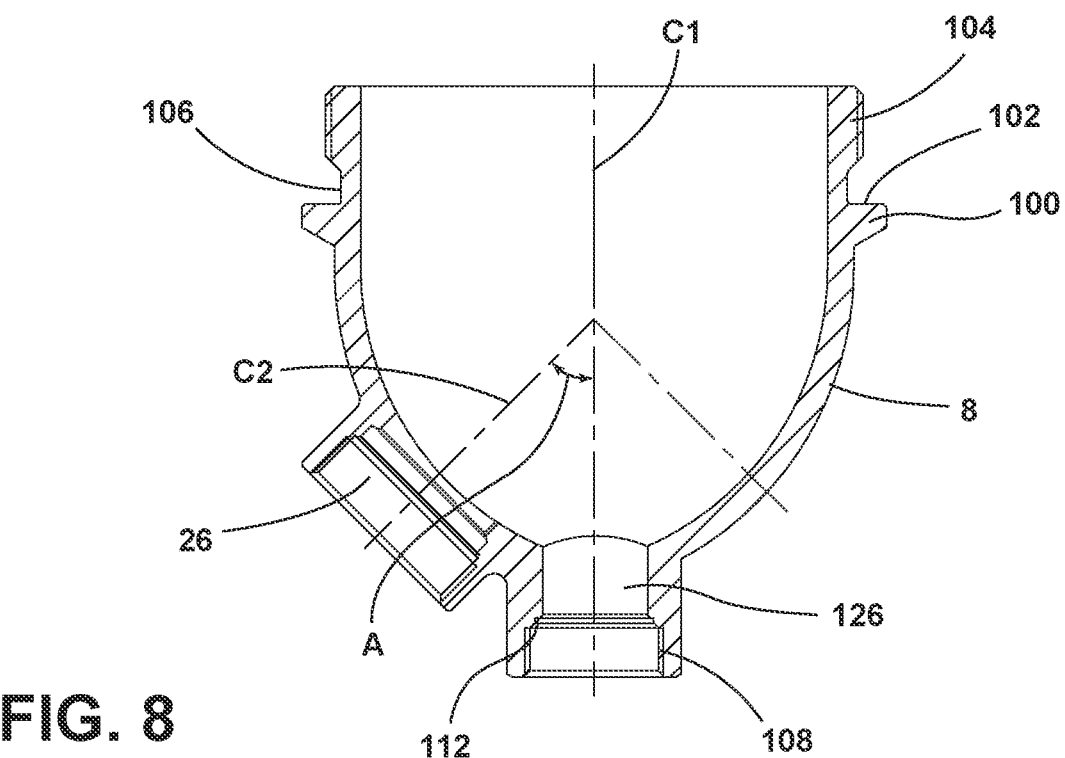
FIG. 8 is a front cross-sectional view of the lower section of the housing shown in FIG. 7.
Figure 9:
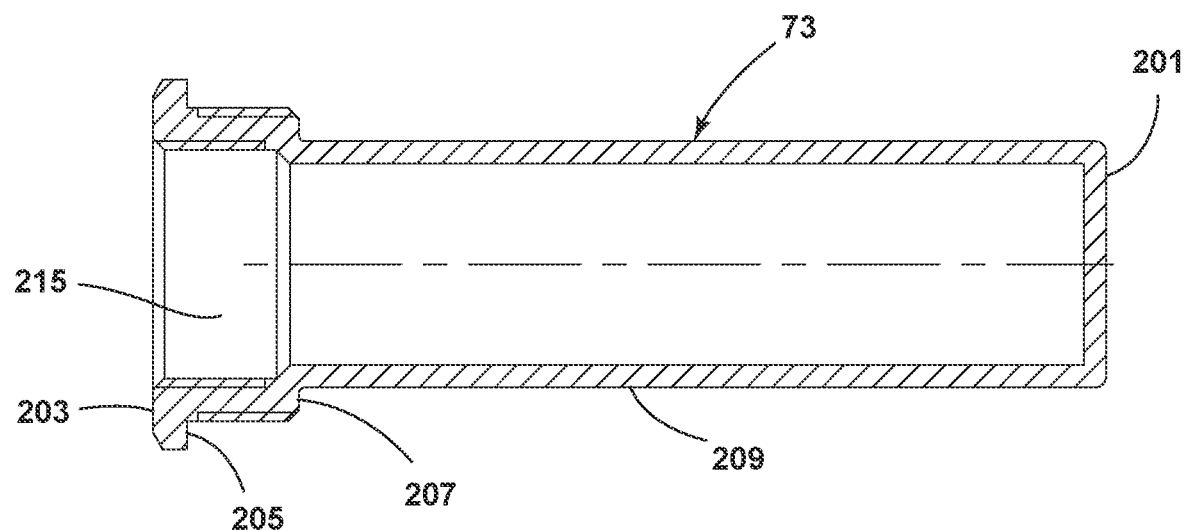
FIG. 9 is a side cross-sectional view of a protective sleeve for a magnet.
Figure 10:
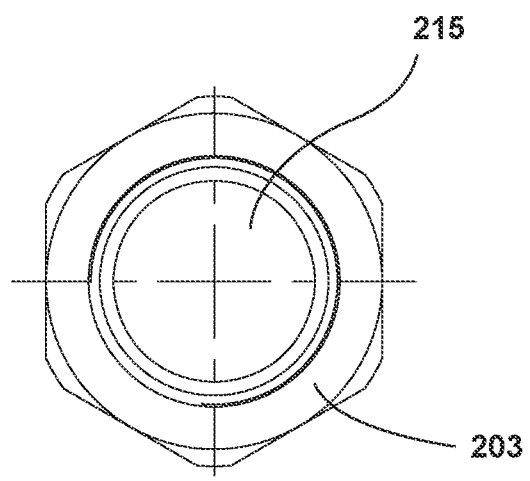
FIG. 10 is a front view of the protective sleeve shown in FIG. 9.

As illustrated in FIGS. 7 and 8, the lower section 8 can have protrusions 100, 104 that create notches 106 and shoulder 102 to help couple the lower section 8 to corresponding surfaces on the upper section 6. In addition, the centerline C2 of the magnetic bar assembly opening 26 is at angle A to the longitudinal centerline C1 of the housing 4 which is in alignment with the fluid passageway 126 for the drain valve 30. The lower section 8 has drain valve opening 108 which can include one or more internal shoulders 112 for coupling a drain valve fitting 83 to the lower section 8. One or more O-rings 81 can be used to help seal the drain valve fitting 83 to drain valve opening 108 in the lower section 8.

The pair of first spaced apart openings 20 and the second spaced apart openings 22 can include a variety of different types and sizes of fittings, such as male iron pipe, female iron pipe, sweat, press fit, push-to-connect, PEX, fusion, or other types of fittings. Moreover, one or more of the fittings could be different than the other fittings on the housing 4. For example, a union fitting 700 (FIGS. 12-13) can be coupled to one or more of the spaced apart openings 20, 22. The union fitting 700 includes a body 701 with a fluid passageway 714. The union fitting 700 is shown as having O-ring grooves 702 with O-rings 704, a sleeve 708 with threading 706, and seals 710. A stainless steel clip ring 712 can be used to hold the union nut 708 in place. This type of union fitting 700 can be utilized to accommodate male iron pipe, female iron pipe, and press or sweat connections to tubing/piping. Other embodiments of the union fitting 700 can be used for any type of connection desired to the spaced apart openings 20, 22. In addition, while the spaced apart openings 20, 22 show a sweat type fitting on FIGS. 2, 4, and 6, the spaced apart openings 20, 22 could be formed with another type of fitting end, such as external threaded ends (FIGS. 1, 3, and 5) to couple with union fittings 700. Moreover, the body 701 of the union fitting 700 could be integrally formed as part of the spaced apart openings (20, 22).

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated. In addition, while certain embodiments have shown threaded connections, the threaded connections could include tape or other sealing material in the threaded connection. In addition, the threaded connection could be replaced by other suitable connections or couplings, such as compression couplings or other couplings.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A hydronic system separator comprising:
    a housing having an upper section and a lower section that is releasably coupled to said upper section, said housing having an internal chamber with an upper portion, a lower portion, and a medial portion therebetween;
    an air separator removably coupled to said upper section with O-ring positioned between a surface of said air separator and said upper section, said air separator having a diaphragm positioned over the top of said upper portion of said internal chamber;
    spaced apart first openings in said housing to permit fluid to pass through said housing in a first direction;
    spaced apart second openings in said housing to permit fluid to pass through said housing in a second direction;
    at least one internal filter positioned on an internal ledge on said upper section withim said upper portion of said internal chamber, said at least one internal filter being in between said spaced apart first openings;
    a magnetic bar removably coupled to said lower section of said housing to position said magnetic bar at an angle between a vertical and a horizontal position within said lower portion of said internal chamber; and
    a drain valve coupled to said lower section of said housing.

2. The hydronic system separator of claim 1, wherein said magnetic bar position is approximately 45° with respect to a longitudinal centerline of said housing.

3. The hydronic system separator of claim 1, including at least one internal filter positioned within said medial portion of said internal chamber between said spaced apart second openings.

4. The hydronic system separator of claim 1, including a temperature and pressure gauge coupled to said upper section of said housing, in fluid communication with said upper portion of said internal chamber.

5. The hydronic system separator of claim 1, wherein said at least one internal filter is a stainless steel coalescing filter.

6. The hydronic system separator of claim 1, wherein said magnetic bar is positioned within a protective sleeve.

7. The hydronic system separator of claim 6, wherein said magnetic bar is rated 12,000 Gauss or higher.

8. A separator assembly comprising:
    a housing having an upper section and a lower section that is releasably coupled to said upper section, said housing having an internal chamber with an upper portion, a lower portion, and a medial portion therebetween;
    an air separator removably coupled to said upper section with O-rings positioned between a surface of said air separator and said upper section, said air separator having a diaphragm positioned over the top of said upper portion of said internal chamber;
    spaced apart first openings in said housing to permit fluid to pass through said housing in a first direction;
    spaced apart second openings in said housing to permit fluid to pass through said housing in a second direction;
    at least one first internal filter positioned on an internal ledge on said upper section within said upper portion of said internal chamber, said at least one internal filter being in between said spaced apart first openings;
    a magnetic bar removably coupled to said lower section of said housing to position said magnetic bar at an approximately 45° angle with respect to a longitudinal centerline of said housing; and
    a drain valve coupled to said lower section of said housing.

9. The separator assembly of claim 8, including at least one second internal filter positioned within said medial portion of said internal chamber between said spaced apart second openings.

10. The separator assembly of claim 8, including a temperature and pressure gauge coupled to said upper section of said housing, in fluid communication with said upper portion of said internal chamber.

11. The separator assembly of claim 8, wherein said at least one first internal filter is a stainless steel coalescing filter.

12. The separator assembly of claim 9, wherein said at least one second internal filter is a stainless steel coalescing filter.

13. The separator assembly of claim 8, wherein said magnetic bar is positioned within a protective sleeve.

14. The separator assembly of claim 13, wherein said magnetic bar is rated 12,000 Gauss or higher.

15. A hydronic system separator assembly comprising:
- a housing having an upper section and a lower section that is releasably coupled to said upper section, said housing having an internal chamber with an upper portion, a lower portion, and a medial portion therebetween;
- an air separator removably coupled to said upper section with O-ring positioned between a surface of said air separator and said upper section, said air separator having a diaphragm positioned over the top of said upper portion of said internal chamber;
- spaced apart first openings in said housing to permit fluid to pass through said housing in a first direction;
- tubing coupled to said spaced apart first openings;
- spaced apart second openings in said housing to permit fluid to pass through said housing in a second direction;
- tubing coupled to said spaced apart second openings;
- at least one internal filter positioned on an internal ledge on said upper section within said upper portion of said internal chamber, said at least one internal filter being in between said spaced apart first openings;
- a magnetic bar removably coupled to said lower section of said housing to position said magnetic bar at an angle between a vertical and a horizontal position within said lower portion of said internal chamber; and
- a drain valve coupled to said lower section of said housing.

16. The hydronic system separator assembly of claim 15, wherein said angled position is approximately 45° with respect to a longitudinal centerline of said housing.

17. The hydronic system separator assembly of claim 15, including at least one internal filter positioned within said medial portion of said internal chamber between said spaced apart second openings.

18. The hydronic system separator assembly of claim 15, including a temperature and pressure gauge coupled to said upper section of said housing, in fluid communication with said upper portion of said internal chamber.

19. The hydronic system separator assembly of claim 15, wherein said at least one internal filter is a stainless steel coalescing filter.

20. The hydronic system separator assembly of claim 15, wherein said magnetic bar is positioned within a protective sleeve.

* * * * *

UNITED STATES PATENT AND TRADEMARK OFFICE
CERTIFICATE OF CORRECTION

PATENT NO. : 11,707,705 B2
APPLICATION NO. : 17/308087
DATED : July 25, 2023
INVENTOR(S) : Mason et al.

It is certified that error appears in the above-identified patent and that said Letters Patent is hereby corrected as shown below:

In the Claims

Column 8, Claim 1, Line 8, "O-ring" should be --O-rings--.

Column 8, Claim 1, Line 17, "withim" should be --within--.

Column 9, Claim 15, Line 25, "O-ring" should be --O-rings--.

Signed and Sealed this
Twenty-seventh Day of August, 2024

Katherine Kelly Vidal
*Director of the United States Patent and Trademark Office*